United States Patent Office 3,166,556
Patented Jan. 19, 1965

3,166,556
PREPARATION OF NITROGEN-HETEROCYCLIC COMPOUNDS
Maximilian I. Fremery and Ellis K. Fields, Chicago, Ill., assignors to Standard Oil Company, Chicago, Ill., a corporation of Indiana
No Drawing. Filed May 28, 1962, Ser. No. 197,856
16 Claims. (Cl. 260—251)

This invention relates to the preparation of heterocyclic 6-atom ring structures. More particularly, it concerns a novel process for producing compounds having a nitrogen-heterocyclic 6-atom ring structure from feed stocks having a 5-atom diolefinic ring.

Organic compounds having a heterocyclic ring of 6 atoms, including at least 1 nitrogen atom, in an aromatic structure are widely used in a number of applications. Pharmaceuticals, pesticides, and dyes commonly make use of compounds having nitrogen-heterocyclic 6-atom ring structures.

It has now been discovered pursuant to the invention that these compounds may be prepared economically and in high yields from feed stocks having a 5-atom diolefinic ring structure by reacting the feed stock with ozone while in an emulsion with ammonia. This novel reaction, hereinafter sometimes referred to as "amozonolysis," is of broad applicability, and may be employed with a wide variety of mononuclear and fused-ring alicyclic or heterocyclic feeds. Typical examples of the invention are shown below.

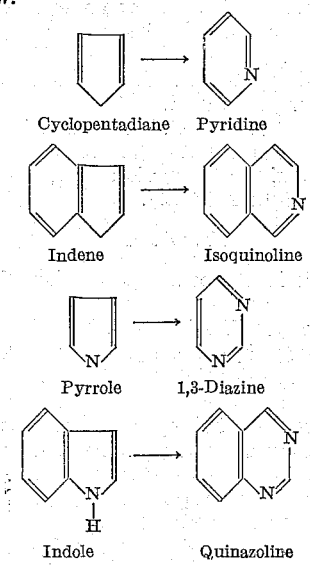

Cyclopentadiene → Pyridine

Indene → Isoquinoline

Pyrrole → 1,3-Diazine

Indole → Quinazoline

The inventive reaction takes place under mild conditions. Temperatures as low as —100° C. or even lower are suitable, and there is no need to conduct the reaction above about +100° C. Optimum temperatures appear to be in the range of about —20 to about —40° C., as under these conditions amozonolysis takes place rather cleanly, without undue byproduct formation. Temperatures below —40° C. are desirable particularly in connection with heterocyclic feed stocks, especially where the heterocyclic atom is somewhat vulnerable, e.g., sulfur, oxygen, mercury, arsenic, etc.

It is preferred to maintain an excess of ammonia in the reaction zone. A molar ratio of ammonia to feed stock in excess of 3:1 appears to be most desirable, with an optimum molar ratio of between about 10 and 15.

The ammonia is desirably present either in the form of anhydrous ammonia or as a concentrated ammonium hydroxide solution. There appears to be no difference in result, although concentrated aqueous ammonia solutions, e.g., about 60 weight percent $NH_4OH$ or higher, offer convenience with respect to eliminating the need for pressure containing equipment at higher temperatures.

Because the feed stocks and the ammonia or ammonium hydroxide are ordinarily immiscible, it is necessary to maintain the two liquids in the form of a well dispersed emulsion. Very vigorous stirring, or other means of imposing intimate dispersion, has been found advantageous from the standpoint of high yields and low byproduct formation. For optimum practice of the invention an emulsifying agent, or surfactant, should be added in minor amounts, e.g., from about 0.01 to about 5 weight percent based on feed.

The choice of emulsifying agent is limited by the strong oxidation conditions during the reaction. The emulsifier should be stable to the ammoniacal reaction medium, organic peroxides, oxygen, and ozone. The preferred surfactants are the nonionic type, e.g., the polyoxyethylene lauryl alcohol (commercially supplied as Brij 30). Emulsifiers containing epoxy, polyoxy, hydroxy, polyhydroxy and ether groups of sufficient stability are likewise quite suitable. From a practical standpoint amozonolysis conditions mitigate against the satisfactory use of emulsifiers with hydrophilic groups which undergo oxidation or saponification. Anionic and cationic surfactants also appear to be less desirable, as many of these are incapable of forming fine emulsion particles. While the foregoing preferred emulsifying agents are recommended, lower but nonetheless adequate yields of product have been obtained with ionic surfactants such as long chain n-alkyl-sodium benzene sulfonate, sodium lauryl sulfate, and sodium stearate.

Ozone may be provided from any of the sources generally known to the art; see for example "Ozone Chemistry and Technology," Advances in Chemistry Series 21, American Chemical Society (1959). Most ozone generators produce an ozone-containing effluent gas from a feed gas of technically pure oxygen, or any oxygen-containing gas such as air, by electric discharge. The ozone may be concentrated, e.g., liquified or the like, and employed in concentrated form, although it has been found most convenient to use, on a laboratory scale, the output of a Welsbach T-23 ozonator, producing about 2.8–3.0 weight percent ozone in an oxygen carrier.

The feed stocks of the present invention, while of broad nature, must nonetheless have a particular structural configuration, as set forth above. It must have a 5-atom diolefinic ring structure as the reactive nucleus, with the atoms defining the double bonds consisting of carbon atoms only. The fifth atom on the ring however may either be a carbon atom or a non-carbon atom, depending on whether the feed is alicyclic or heterocyclic. The fifth atom should however be sufficiently resistant to ozonization to survive amozonolysis; nitrogen is generally adequate in this respect, while sulfur, oxygen, mercury, arsenic, etc. are suitable but somewhat less stable.

The 5-atom diolefinic ring structure appears to be essential. If the ring has only one double bond, as in cyclopentene, rather than forming a simple 6-membered heterocyclic product, the reaction appears to go through a hydroxy - hydroperoxy - amine, which spontaneously cleaves water to give the cycloamine-hydroperoxide, which in turn is reduced to alpha-hydroxy-cyclohexylimine and thence to a polymer of 1,2-dihydropyridine. The amozonolysis reaction products of rings of more than 5 members likewise form polymers, which are white solids that, when steamed, split off ammonia and form useful dialdehydes.

The double bond on the ring may be simple olefinic bonds as in cyclopentadiene, or one of them may be derived from an aromatic ring as in indene. Both however cannot be derived from aromatic rings, nor can there be three double bonds as in acenaphthalene.

Subject to the foregoing conditions of structure, a considerable variety of feed stocks may be profitably subjected to amozonolysis. The 5-member diene ring may be substituted at any or all of its positions by hydrocarbon or non-hydrocarbon groups, e.g., alkyl, aryl, aralkyl, alkaryl, alkenyl, nitro, halo, carboxy, etc. Where the substituent is capable of undergoing reaction with ammonia or with ozone, it will ordinarily so react but will not affect the basic amozonolysis to the hetrocyclic 6-member ring. Thus, for example, if the feed stock has an aldehyde group, this will ordinarly condense with ammonia to give an imino substituent, while at the same time the 5-membered ring undergoes amozonolysis.

Examples of suitable reactants include: alicyclic mononuclear compounds such as cyclopentadiene, the various alkyl cyclopentadienes such as 1-methyl and 1,2-dimethyl fulvene, dimethyl fulvene, diphenyl fulvene; alicyclic fused ring compounds such as indene, 3-methyl indene, etc; heterocyclic mononuclear compounds such as pyrrole, 2,3-dimethyl pyrrole, 2-pyrrole carboxylic acid, 2-pyrrole aldehyde, dipyrryl methane, and the porphyrins; heterocyclic fused ring compounds such as indole, dioxindole, oxindole, and indoxyl; and the sulfur, oxygen, mercury, phosphorus, arsenic, lead, etc. analogues of the foregoing heterocyclics, e.g., thiazole, thiophene, furan, dimethylfuran, etc. In each case, amozonolysis converts a —C=C— to a —C=N—C— group.

Recovery of the product from a reaction mixture is ordinarily quite simple, it being merely necessary to settle the emulsion and recover the organic phase, followed by distillation to recover the product. If difficulties are encountered and it is suspected that these result from an undecomposed hydroperoxide intermediate, hydroperoxide decomposition may be accelerated by addition of homolysis catalysts such as cobalt ions or reducing agents such as sulfites, either during the ozonization or immediately after its termination.

Should either the feed stock or the product be a solid at reaction temperatures, an atropic solvent, sufficiently inert so as not to deleteriously affect the reaction or to contaminate the product, may be employed to obtain a liquid phase; materials such as dimethoxyethane or chlorobenzene have been found suitable for this purpose.

The invention in its various aspects will be illustrated by the following examples. These are illustrative only and are not intended to be wholly definitive with respect to scope or conditions. Example VIII compares the invention with the reaction of cyclopentene.

*Example I*

This example illustrates the preparation of isoquinoline from indene in aqueous ammonia.

Indene (80 g.) and about 3 g. of Brij 30 surfactant are emulsified in 500 cc. of a previously prepared 50 wt. percent ammonium hydroxide solution at 5–10° C. in an indented 1 l. 3-neck flask, equipped with two gas inlet tubes, high speed stirrer, thermometer, and gas vent; the reactor is immersed in a wet-ice bath. Ozone, being generated by a Welsbach T–23 in a 3 wt. percent concentration in oxygen, percolates through one gas inlet tube, while ammonia is introduced through the other to compensate for the $NH_3$ loss by evaporation. After absorption of about 25 g. ozone the oxidation is interrupted, leaving at least 20 g. indene as excess and the mixture stirred for a further 15 hours. The reaction product settles as a dark-colored oil in a separatory funnel and is isolated. The product is heated in a distillation flask to 60–80° C. at 20 mm. Hg; indene distills off when the pressure is further decreased to about 10 mm. Hg. Isoquinoline distills as second fraction at about 70° C./1.0 mm. Hg, solidifying partially in the condenser. Yield: about 33 g.

*Example II*

This example illustrates the preparation of isoquinoline from indene using ammonia in solution with dimethoxyethane and in the absence of a surfactant.

80 g. indene and 80 g. dimethoxyethane are cooled in the described reactor (Example I) with a Dry-Ice acetone bath to about —75° C. and 160 g. of liquid anhydrous $NH_3$ added under stirring. As described before, ozone and ammonia are introduced until 25 g. ozone is reacted. The excess of liquid ammonia evaporates on slow warming to room temperature with stirring. The residue is distilled. First fraction: Dimethoxyethane. Second fraction: Water from dehydration at reduced pressure and 80° C. Third fraction: Indene—about 20.3 g. Fourth fraction: Isoquinoline, 45.1 g.

*Example III*

This example illustrates the preparation of 4-methyl isoquinoline from 3-methyl indene.

3-methyl-indene was prepared by a Grignard reaction of methyl bromide with indanone-3 and subsequent dehydration of the formed 3-hydroxy-3-methyl-indene to the methyl indene by refluxing in 30% aqueous oxalic acid-solution. B.P. 85°/14 mm. Hg.

35 g. 3-methyl-indene and about 0.3% poly-oxyethylene-lauryl-acohol as surfactant was emulsified in 600 cc. 100% aqueous ammonia solution at —35° C. under stirring. A gas stream of 3% ozone in oxygen was introduced and the ozonization carried on until ozone appeared in the off-gas. After addition of 34 g. finely powdered sodium sulfite (1 mole equiv.) for the accelerated reduction of the hydroperoxide, the reaction mixture was warmed up gradually to room temperature to remove excess ammonia. Final short heating to 100° C. completes the reduction and caused the dehydration of the methyl-iso-quinoline. It was extracted with ether and distilled for purification.

Yield: 48%, B.P.: 78° C./4 mm. Hg, M.P. 8–11° C. which checks the literature-data. Identification by I.R., and by precipitation with picric acid to form a picrate, M.P. 218° C. (Lit.: 213° C.).

*Example IV*

This example illustrates the preparation of quinazoline from indole.

30 g. indole was dissolved in 30 g. dimethoxyethane and 0.3 g. polyoxyethylene-lauryl alcohol added as emulsifier. Addition of this solution to 700 cc. of a turbulated 100% aqueous ammonia solution resulted in an emulsion through which a 3% ozone/oxygen gas-stream was passed. The ozonization was terminated after 20 g. indole were reacted on a calculated schedule. Addition of 22 g. $Na_2SO_3$ reduced the hydroperoxide-groups of the reaction intermediate after or during the evaporation of excess ammonia, as well as dimethoxyethane, by gradual warming of the aqueous solution within 18 hrs. The cooled solution was filtered, through a Celite-layer, to remove the unreacted indole, as well as other water-insoluble products, and the clear filtrate Rinco-evaporated at 30° C./10 mm. Hg to dryness. Leaching of the crystalline residue, with anhydrous ethanol, separated the inorganic salts, from the reaction products, which were—after evaporation of the ethanol—distilled.

B.P. (first fraction at 2 mm.). 102–110° C. B.P. (second fraction at 2 mm.): 110–118° C.

The final fraction crystallized partially, to yield 9 M percent quinazoline, identified by admixed melting point determination with an authentic sample. M.P.: 47° C. The oily part of the first—as well as the total second fraction—were dissolved in water and the purified aqueous solution reacted with picric acid. Quinazoline-picrate precipitated and was identified by admixed M.P. determination. M.P.: 188° C. The residual N-containing reaction components comprised a mixture and were not identified.

Example V

This example illustrates the preparation of pyridine from cyclopentadiene.

The starting material was obtained by distillation from thermally decomposed dicyclopentadiene. 30 g. of the olefin was emulsified with 0.5 wt. percent polyoxyethylene lauryl alcohol as emulsifier in 600 cc. of 100% aqueous ammonia solution prepared by addition of 280 cc. anhydrous liquid ammonia to 350 cc. 30% ammonium hydroxide at −35° C. The emulsion was turbulated in an indented three-neck flask and a gas stream of 3 wt. percent ozone in oxygen introduced at −35° C. which was maintained.

After the absorption of 17.5 g. ozone, 15 grms. of cyclopenadiene were reacted and the ozonization terminated. Gradual warming up to room temperature, under stirring, drives off the excess ammonia, and a subsequent addition of 1 mole equiv. $Na_2SO_3$ per 1 mole equiv. reacted cycyloolefin leads to the reduction of the hydroperoxide. The reaction solution was heated to reflux, after 18 hrs., to complete the reduction. The reaction product was extracted six times, with ether, from the aqueous solution at pH >10 after addition of 5 g. NaOH and saturation with NaCl.

Isolation of the reaction product was carried out with usual techniques. Gas chromatography, as well as mass spectroscopy, determined and identified pyridine. Yield: 10 M percent regarding the total amount of the starting material.

Example VI

This example further illustrates the preparation of pyridine from cyclopentadiene using, however, a semicontinuous feed system.

30 g. cyclopentadiene, containing 0.5 wt. percent polyoxyethylene lauryl alcohol emulsifier, was added in 5 g.-batches (during the ozonization) to 600 cc. of a turbulated 100% aqueous ammonia solution through which a 3% ozone/oxygen-mixture was passed at −35° C. The olefin-addition was kept at a calculated rate, allowing only 50% of cyclopentadiene to be reacted, thus leaving the olefinic component at a continuous excess. The ozonization was terminated when 15 g. cyclopentadiene was reacted on a calculated schedule and the products isolated under the same conditions as described in Example I. Yield of pyridine: 18 M percent.

Example VII

This example illustrates the reaction of cyclopentene.

Ozone was generated by a Welsbach T-23 ozonator by electric discharge in an oxygen stream. Its concentration in oxygen—which served also as a carrier gas—averaged 2.8–3.0 wt. percent. The generator was calibrated for a fixed gas-flow rate, pressure and discharge voltage on $n$ grams $O_3$/hr. Pronon 523, a polyoxyethylene tridecyl alcohol from Process Chem. Corp. served well as emulsifier, as it proved inert towards ozone and oxygen and gave fairly stable olefin emulsions with the ammonia phase at temperatures below −40° C. Ammonia was best used as about 100 wt. percent aqueous ammonia solution rather than anhydrous liquid ammonia for simplicity. It was prepared by cooling an emulsion of 30% aqueous ammonium hydroxide and the cycloolefin to −40° C., followed by a slow addition of a calculated amount of liquid anhydrous ammonia.

An emulsion of 30 g. cyclopentene in 300 g. 30% ammonium hydroxide was established by addition of the hydrocarbon and 0.3 g. Pronon 523 to the well-stirred aqueous ammonia phase in an indented 3-necked 1-l. reaction flask. The reactor was provided with a high speed stirrer, a gas inlet-tube, gas vent and thermometer and immersed partially in a Dry-Ice-acetone bath to maintain the reaction temperature at −40±5° C. 250±10 g. liquid ammonia were condensed in a tared Dry-Ice trap and slowly added to the emulsion so that the temperature did not rise over −35° C.

Subsequently 15.8 g. ozone was introduced into the vigorously turbulated emulsion for a measured reaction time, leaving 2–3 g. cyclopentene in excess. The Dry-Ice bath was removed and 46 g. powder sodium sulfite added for reduction of the hydroperoxide. The excess ammonia was evaporated by letting the mixture warm to room temperature over 10 hours and refluxing for a few minutes. The organic product was extracted with ether six times; the ether solution was dried and distilled. It gave a water soluble, colorless, nitrogen-containing liquid, which cleaved water during distillation at 80° C./20 mm. with polymerization to a resin.

From theoretical considerations, it is believed that the cyclopentene forms a hydroxy-hydroperoxy-amine, which spontaneously cleaves water to give the cycloamine-hydroperoxide. This hydroperoxide is reduced spontaneously by ammonia at −35° C., and this reduction may be accelerated substantially by addition of homolysis catalysts such as cobalt ions or reducing agents, either during the ozonization or immediately thereafter to form alpha-hydroxy-cyclohexyl-amine; this was not isolated due to spontaneous dehydration at elevated temperatures (50–60° C.) to form 1,2-dihydropyridine which immediately polymerizes. Alternatively, the cycloamine-hydroperoxide may be reduced with sodium borohydride to obtain the alpha-hydroxy piperidine and subsequently the stable piperidine.

Thus it is apparent that there has been provided an entirely new reaction in the field of organic chemistry. A 5-membered alicyclic or heterocyclic diolefinic ring, by treatment with ozone in the presence of ammonia, yields a 6-membered nitrogen-heterocyclic structure. The resultant products are exceedingly useful in many applications.

While the invention has been described and discussed in relation to certain specific embodiments thereof, it is manifest that these are for illustrative purposes only. Accordingly, many alternatives, modifications, and variations will be evident to those skilled in the art in light of the foregoing description, and thus it is intended to embrace all such alternatives, modifications, and variations as fall within the spirit and broad scope of the appended claims.

We claim:

1. A method of producing nitrogen-heterocyclic 6-atom ring structures from a feed stock having a 5-atom diolefinic ring structure, said ring structure having each of its double bonds located between carbon atoms, with not more than one of said double bonds being derived from an aromatic ring, which comprises reacting said feed stock with ozone while in an emulsion with ammonia.

2. Method of claim 1 wherein said feed stock is a mononuclear alicyclic feed stock.

3. Method of claim 2 wherein said feed stock is cyclopentadiene.

4. Method of claim 1 wherein said feed stock has an alicyclic 5-atom ring fused to an aromatic ring.

5. Method of claim 4 wherein said stock is indene.

6. Method of claim 4 wherein said feed stock is 3-methyl indene.

7. Method of claim 1 wherein said feed stock is a mononuclear heterocyclic feed stock.

8. Method of claim 7 wherein said feed stock is a nitrogen heterocyclic.

9. Method of claim 8 wherein said feed stock is pyrrole.

10. Method of claim 1 wherein said feed stock has a heterocyclic 5-atom ring fused to an aromatic ring.

11. Method of claim 10 wherein said feed stock is indole.

12. Method of claim 1 wherein said reaction is effected in the presence of a stable emulsifier.

13. Method of claim 1 wherein said ammonia is in the form of anhydrous ammonia.

14. Method of claim 1 wherein said ammonia is in the form of concentrated ammonium hydroxide.

15. Method of claim 1 wherein said reaction is effected at a temperature within the range of $-100°$ C. to $+100°$ C. and in the presence of at least 3 moles of ammonia per mole of feed stock.

16. Method of claim 15 wherein said reaction temperature is in the range of $-40$ to $-20°$ C.

References Cited in the file of this patent

Capuano et al.: Gazz. Chim. ital., vol. 86 (1956), pp. 119–25.

Capuano et al.: Gazz. Chim. ital., vol. 86 (1956), pp. 126–31.